(12) United States Patent
Naitoh

(10) Patent No.: US 8,400,666 B2
(45) Date of Patent: Mar. 19, 2013

(54) INFORMATION PROCESSING APPARATUS AND INFORMATION PROCESSING METHOD

(75) Inventor: Yoshiko Naitoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1848 days.

(21) Appl. No.: 11/422,478

(22) Filed: Jun. 6, 2006

(65) Prior Publication Data

US 2007/0035638 A1 Feb. 15, 2007

(30) Foreign Application Priority Data

Jun. 8, 2005 (JP) .................................. 2005-168402
Apr. 20, 2006 (JP) .................................. 2006-117190

(51) Int. Cl.
*G06F 15/00* (2006.01)
(52) U.S. Cl. ..... 358/1.16; 358/1.1; 358/1.15; 348/226.1
(58) Field of Classification Search .................. 358/1.1, 358/1.15, 1.9, 1.19, 226.1; 348/226.1
See application file for complete search history.

(56) References Cited

U.S. PATENT DOCUMENTS

| | | | |
|---|---|---|---|
| 6,025,925 A | 2/2000 | Davidson, Jr. et al. | 358/1.15 |
| 6,597,469 B1 | 7/2003 | Kuroyanagi | |

FOREIGN PATENT DOCUMENTS

| | | |
|---|---|---|
| EP | 0996041 B1 | 4/2000 |
| EP | 1126391 A2 | 8/2001 |
| EP | 1345388 A2 | 9/2003 |
| EP | 1521195 A | 4/2005 |
| EP | 1521195 A1 * | 4/2005 |
| GB | 2353071 A | 3/2001 |
| GB | 2353971 A * | 3/2001 |
| JP | 11-203083 A | 7/1999 |
| JP | 2001-256007 A | 9/2001 |
| JP | 2001-358891 | 12/2001 |
| JP | 2002-090165 A | 3/2002 |
| JP | 2004-310578 A | 11/2004 |

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

Print log information representing an output sheet count in each of a plurality of image forming devices is acquired. Next, print log information of output products is acquired for each department or user capable of using the image forming device. Then, total print log information representing the output sheet count of the plurality of image forming devices is acquired. When the sum of output sheet counts specified by the print log information acquired first coincides with the sum of output sheet counts specified by the total print log information, the print log information or total print log information acquired for the department or user is decided as the sum of output sheet counts of the department or user.

13 Claims, 14 Drawing Sheets

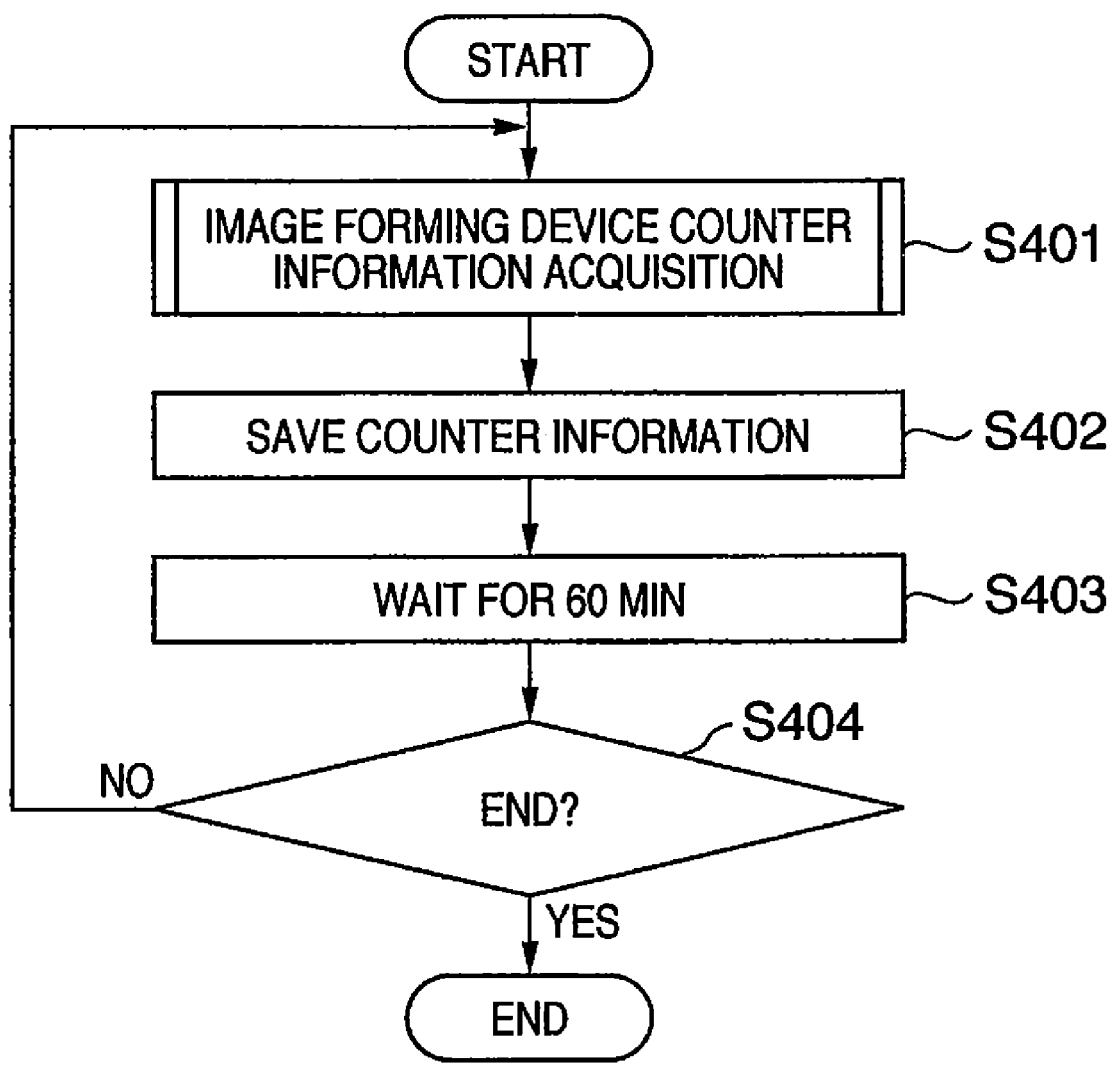

FIG. 7A

| NUMBER n1 OF DEPARTMENTS |
|---|
| NUMBER m1 OF COUNTERS |
| DEPARTMENT ID1 |
| DEPARTMENT ID2 |
| ... |
| DEPARTMENT IDn1 |

| DEPARTMENT ID1 | |
|---|---|
| COUNTER ID1 | 1000 |
| COUNTER ID2 | 587 |
| ... | ... |
| COUNTER IDm1 | 134 |

FIG. 7B

| NUMBER n2 OF COUNTERS |
|---|

| COUNTER ID1 | 15800 |
|---|---|
| COUNTER ID2 | 4670 |
| ... | ... |
| COUNTER IDn2 | 8791 |

FIG. 12

| | | |
|---|---|---|
| S1201 | DEVICE SPECIFYING INFORMATION | 192.168.1.10 |
| S1202 | DEPARTMENT COUNT | 2 |
| S1203 | COUNTER TYPE COUNT OF EACH DEPARTMENT (NUMBER m1 OF COUNTERS) | 3 |
| S1204 | ACCOUNTING COUNTER TYPE COUNT (NUMBER n2 OF COUNTERS) | 5 |
| S1205 | DEPARTMENT ID1 | AAAA |
| S1206 | DEPARTMENT COUNTER 1 (TOTAL SHEET COUNT) | 1000 |
| S1207 | DEPARTMENT COUNTER 2 (COLOR COPY SHEET COUNT) | 200 |
| S1208 | DEPARTMENT COUNTER 3 (COLOR PRINTED SHEET COUNT) | 400 |
| S1209 | DEPARTMENT ID2 | BBBB |
| S1210 | DEPARTMENT COUNTER 1 (TOTAL SHEET COUNT) | 1500 |
| S1211 | DEPARTMENT COUNTER 2 (COLOR COPY SHEET COUNT) | 350 |
| S1212 | DEPARTMENT COUNTER 3 (COLOR PRINTED SHEET COUNT) | 350 |
| S1213 | ACCOUNTING COUNTER 1 (TOTAL SHEET COUNT) | 2500 |
| S1214 | ACCOUNTING COUNTER 2 (COLOR COPY SHEET COUNT) | 550 |
| S1215 | ACCOUNTING COUNTER 3 (COLOR PRINT SHEET COUNT) | 950 |
| S1216 | ACCOUNTING COUNTER 4 (COLOR LARGE SHEET COUNT) | 300 |
| S1217 | ACCOUNTING COUNTER 5 (MONOCHROME LARGE SHEET COUNT) | 400 |

INFORMATION PROCESSING APPARATUS AND INFORMATION PROCESSING METHOD

FIELD OF THE INVENTION

The present invention relates to a mechanism for acquiring a print log such as a counter value from an image forming device such as a copying machine or printer managed from a remote site.

BACKGROUND OF THE INVENTION

In the copying machine business, accounting is generally done on the basis of a total printed sheet count acquired from an image forming device such as a copying machine. For example, generally, the printed sheet counts of a plurality of image forming devices installed at a customer's location are totalized in each specific department. On the basis of this information, the printing cost is distributed to the departments (e.g., prior art reference 1: Japanese Patent Laid-Open No. 2001-358891).

However, in an image forming device that cannot save a status such as a printed sheet count at a given point of time, if printing is executed during acquisition of information about the printed sheet count, the total printed sheet count totalized in each department does not match the total printed sheet count to be used for accounting. This may pose a problem in, e.g., cost distribution.

For example, assume a service to provide accounting information of each department to a customer. If the total printed sheet count of image forming devices does not coincide with the sum of printed sheet counts of the respective departments, the accounting information itself is not reliable.

As one reason for this, an information processing apparatus for executing accounting can manage a large number of departments. For example, assume that the number of manageable departments is about 1,000 at maximum, and about 0.1 sec is required to acquire the counter value of a department. In this case, a time of about 100 sec is required to acquire the counter values of all the 1,000 departments. There is a high probability that the counter values will change as new print processing is executed in the image forming devices during counter value acquisition. A true total printed sheet count is not obtained, because the total printed sheet count totalized in the departments does not match the total printed sheet count which is acquired from the image forming devices to be used for accounting, resulting in lack of accuracy.

Another form can also be assumed in which the sum of a printed sheet count totalized in a plurality of departments and the printed sheet count to be used for accounting at a certain point of time is held in the image forming device as fixed data, and a management device is notified of the held data. This technique may solve the above-described problem. However, various kinds and models of image forming devices are assumed to be managed by the management device, and the image forming devices do not always all satisfy the assumed specifications.

SUMMARY OF THE INVENTION

According to an aspect of the present invention, there is provided an information processing apparatus comprising: first acquisition unit adapted to acquire output log information in an image forming device; second acquisition unit adapted to acquire the output log information in the image forming device for one of a department and a user set for the image forming device; third acquisition unit adapted to acquire the output log information in the image forming device again after output log information acquisition by the second acquisition unit; determination unit adapted to determine whether the output log information acquired by the third acquisition unit has changed from that acquired at an acquisition timing of the output log information by the first acquisition unit; and decision unit adapted to decide the output log information acquired by the second acquisition unit as the output log information for one of the department and the user if the determination unit determines that the output log information has not changed.

According to an aspect of the present invention, there is provided an information processing method comprising the steps of: acquiring output log information in an image forming device; acquiring the output log information in the image forming device for one of a department and a user set for the image forming device; acquiring the output log information in the image forming device again after output log information acquisition in the second acquiring step; determining whether the output log information acquired in the third acquiring step has changed from that acquired at an acquisition timing of the output log information in the first acquiring step; and deciding the output log information acquired in the second acquiring step as the output log information for one of the department and the user if it is determined in the determining step that the output log information has not changed.

Other objects of the present invention will be apparent with the following drawings and a detailed description described below.

BRIEF DESCRIPTION OF THE DRAWINGS

FIGS. 4A and 4B are flowcharts for explaining counter information gathering processing procedures of the information-gathering device 101 according to an embodiment of the present invention;

FIGS. 7A and 7B are views for explaining an example of the holding format of counter values that are held in the image forming device according to an embodiment of the present invention;

FIG. 12 is a view showing the holding format of counters acquired by image forming device counter acquisition processing shown in FIG. 11.

DETAILED DESCRIPTION OF THE PREFERRED EMBODIMENTS

The embodiments of the present invention will be described below with reference to the accompanying drawings.
(First Embodiment)

Figure 1:
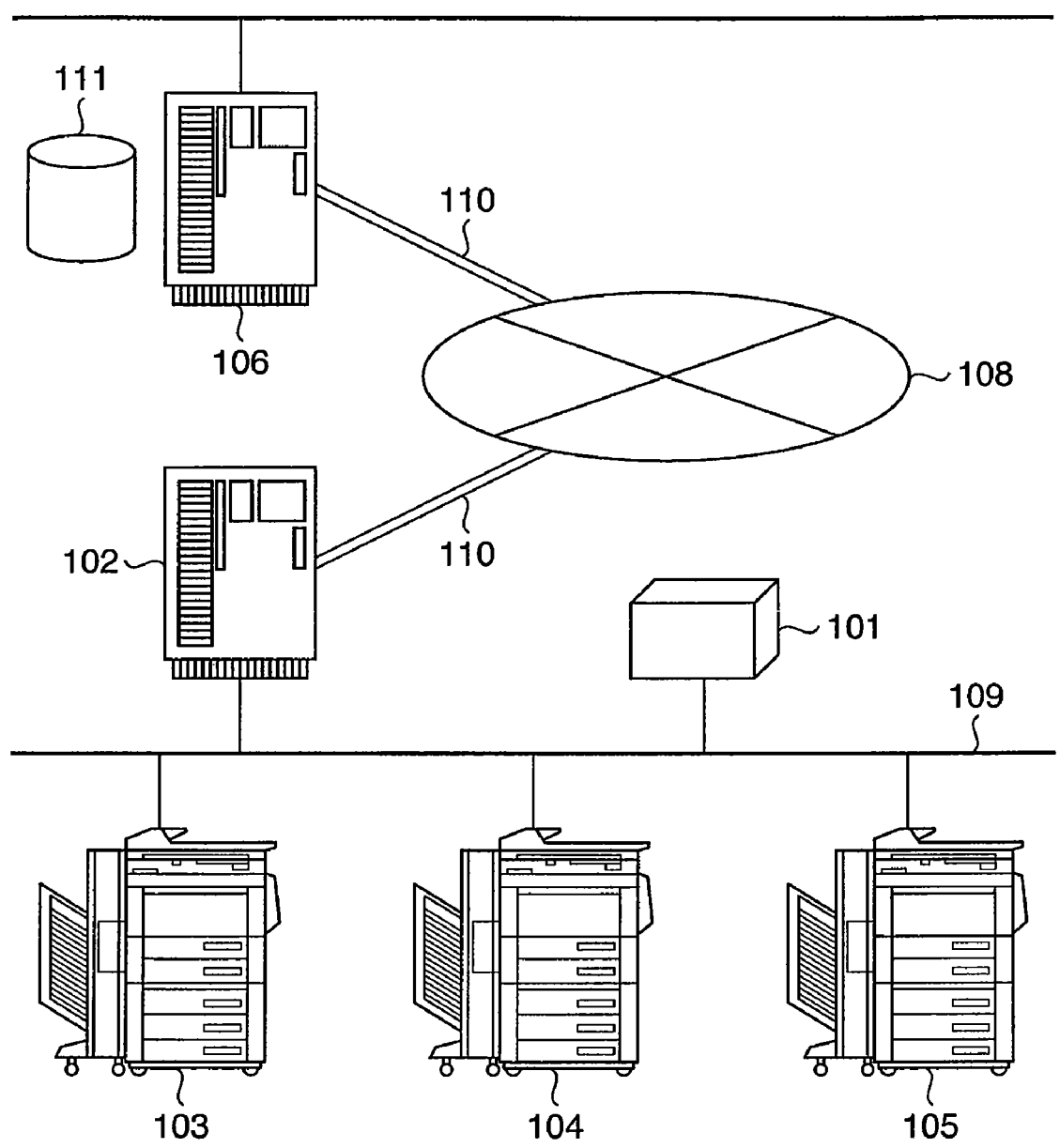
FIG. 1 is a view showing the overall configuration of an image forming system according to an embodiment of the present invention.

FIG. 1 is a view showing the overall configuration of an image forming system according to an embodiment of the present invention. In this embodiment, a center management server 106 and a local management server 102 can communicate under a predetermined protocol 110 through a communication line 108 such as the Internet, as shown in FIG. 1. These servers function as remote monitoring devices that monitor the statuses of image forming devices (to be described later) from remote sites. As the protocol 110 to connect the center management server 106 and local management server 102, a general protocol (SMTP) and authentication are used to, e.g., prevent illegal access and cross over the firewall.

FIG. 1 illustrates only one local management server 102. However, the system may be designed such that a plurality of local management servers and the center management server 106 to collectively manage the plurality of local management servers can communicate through the communication line 108. The local management server 102 and center management server 106 have, as an internal or external device, a gathered data storage device 111 to store information transmitted from an information-gathering device 101 (to be described later).

The local management server 102 shown in FIG. 1 can communicate with a plurality of image forming devices 103, 104, and 105 connected through a network 109 such as a LAN. Examples of the image forming device are a printer (including an electrophotographic printer and an ink-jet printer), scanner, facsimile apparatus, digital multifunctional peripheral unifying a printer function and a facsimile function, personal computer, and print server. Details of the image forming device will be described later. The information-gathering device 101 gathers various kinds of device information such as the device status, toner remaining amount, and printed sheet count of the plurality of image forming devices 103, 104, and 105 and transmits the information to the center management server 106 or local management server 102 that functions as a remote monitoring device.

Figure 2:
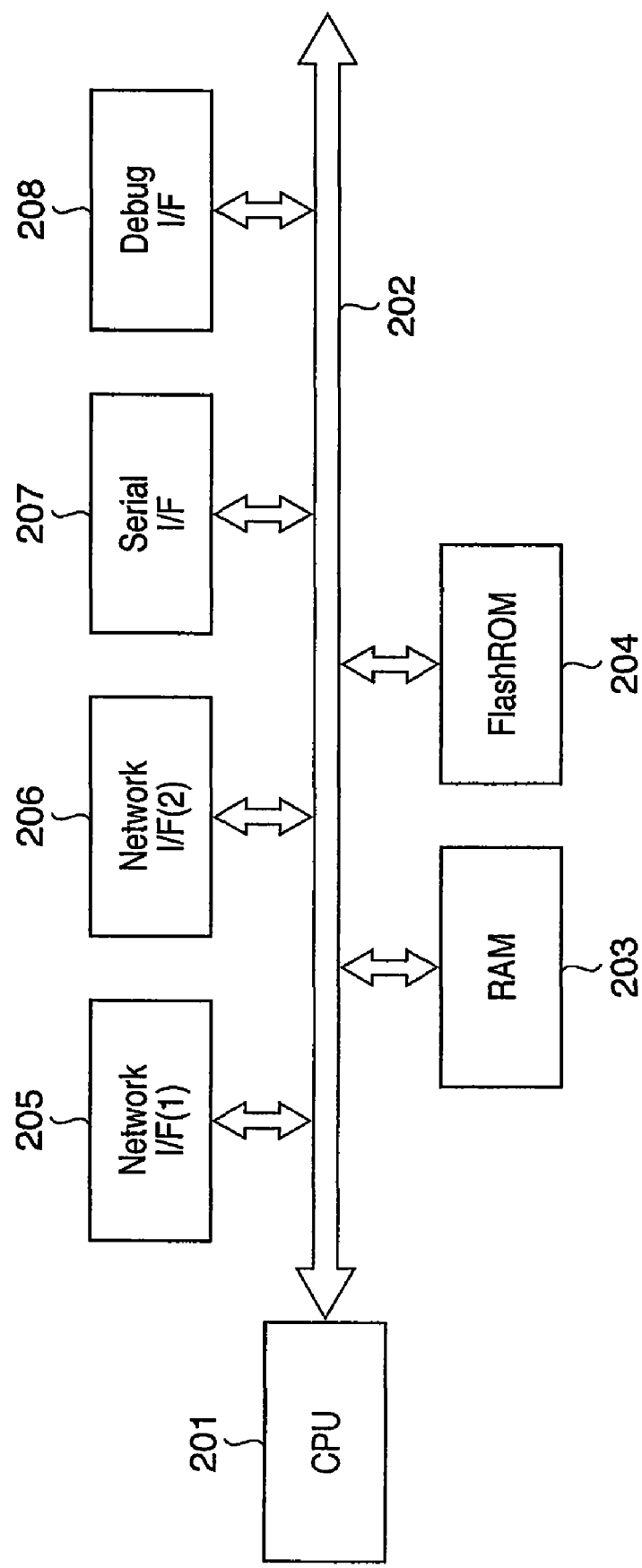
FIG. 2 is a block diagram showing the hardware configuration of an information-gathering device 101 shown in FIG. 1.

FIG. 2 is a block diagram showing the hardware configuration of the information-gathering device 101 shown in FIG. 1. As shown in FIG. 2, the information-gathering device 101 comprises a CPU 201, a RAM 203 capable of electrically storing and rewriting information, and an electrically rewritable flash ROM 204 capable of storing information even in a power-off state. The information-gathering device 101 also comprises two network interfaces (Network I/Fs) 205 and 206 which exchange information with an external device through the network 109, and a serial I/F 207 which exchanges information by RS232c serial communication. The information-gathering device 101 also comprises a debug I/F 208 of serial communication to be used for debug, and a bus 202 to transfer data between the above-described components.

Information-gathering processing of the information-gathering device 101 will be described below in detail with reference to the accompanying drawings. In this embodiment, information transmission to the information-gathering device 101 and local management server 102 is done by SMTP, and information reception is done by POP.

Figure 3A:
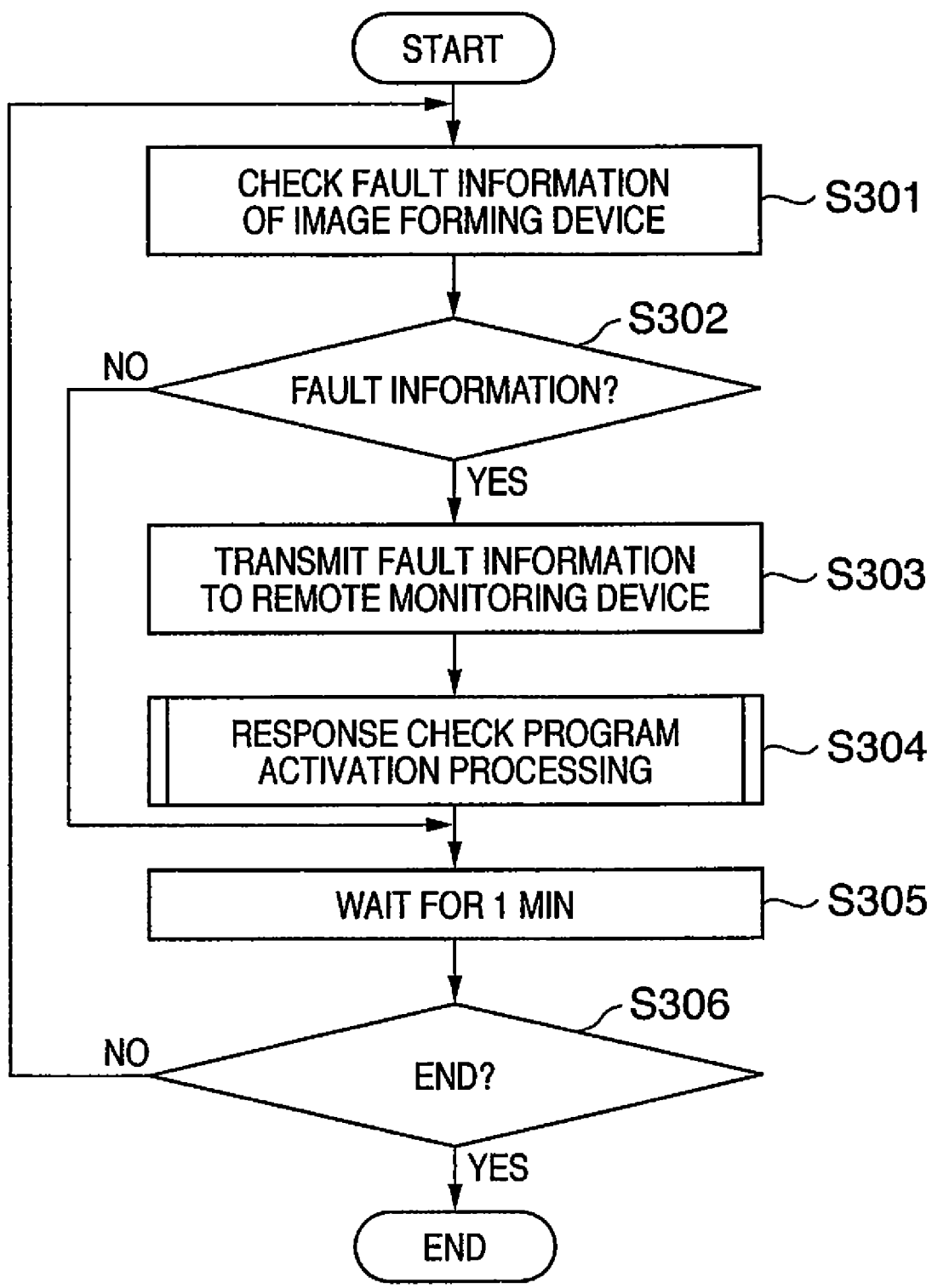
FIGS. 3A and 3B are flowcharts for explaining image forming device fault information monitoring processing by the information-gathering device 101 according to an embodiment of the present invention.
Figure 3B:
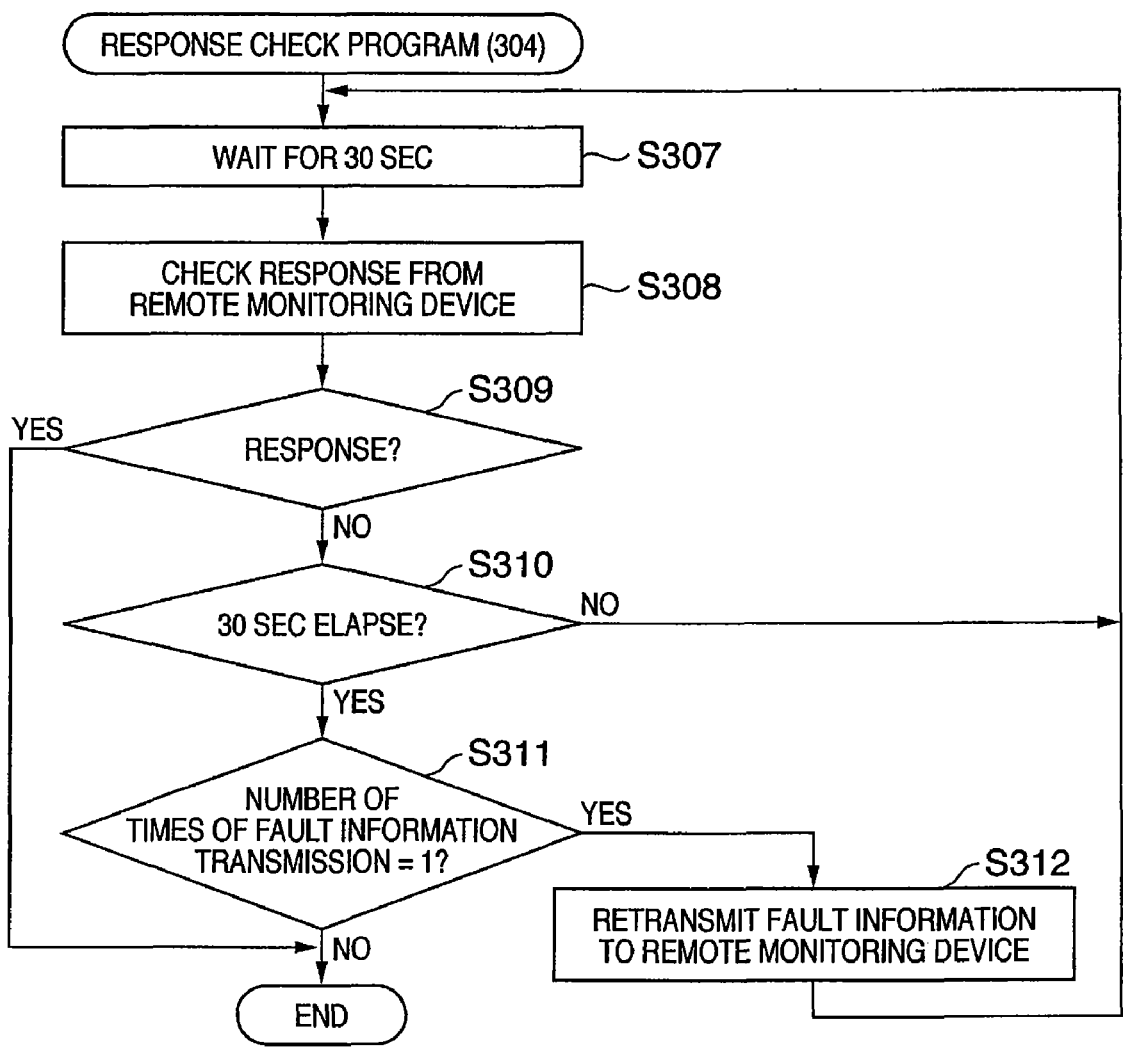

FIGS. 3A and 3B are flowcharts for explaining image forming device fault information monitoring processing by the information-gathering device 101 according to an embodiment of the present invention. The fault monitoring processing is executed on the basis of a fault information check program and response check program stored in the information-gathering device 101.

Processing based on the fault information check program will be described first with reference to the flowchart shown in FIG. 3A.

To check fault information of the image forming devices 103, 104, and 105, the information-gathering device 101 acquires information by a specific protocol through the network 109 (S301). The information-gathering device 101 determines whether fault information is acquired (S302). If the information-gathering device 101 determines that fault information is acquired (Yes), the acquired fault information is transmitted to the local management server 102 or center management server 106 functioning as a remote monitoring device (S303). If the information-gathering device 101 determines in step S302 that no fault information is acquired (No), the flow advances to step S305.

After the fault information is transmitted to the remote monitoring device in step S303, the information-gathering device 101 activates the response check program to check that the fault information is correctly transmitted to the local management server 102 or center management server 106 functioning as a remote monitoring device. Response check processing is executed on the basis of the program (S304). The response check processing executed by activating the response check program will be described later in detail.

After the processing by the response check program in step S304 is ended, the information-gathering device waits for a predetermined time (e.g., 1 min in this embodiment) (S305). After that, the information-gathering device 101 determines whether an end instruction to the fault information check program in the active state is input (S306). If it is determined that an end instruction to the fault information check program is input (Yes), the program is ended, and the processing is ended. If no program end instruction is input (No), the flow returns to step S301 to repeat the above-described processing.

The response check processing executed by activating the response check program in step S304 will be described next with reference to FIG. 3B.

When the response check program is activated, the information-gathering device 101 waits for a predetermined time (e.g., 30 sec in this embodiment) (S307). To check the response from the local management server 102 or center management server 106 functioning as a remote monitoring device, the information-gathering device 101 inquires of a POP server (S308) and determines the presence/absence of a response (S309). If it is determined that a response is received (Yes), i.e., if response mail from the local management server 102 or center management server 106 is received, the processing is ended. If it is determined in step S309 that no response is received (No), the flow advances to step S310.

In step S310, the information-gathering device 101 determines whether a predetermined response check maximum time (e.g., 30 sec in this embodiment) has elapsed. If it is determined that the predetermined response check maximum time has not elapsed yet (No), the flow returns to step S307 to repeat the above-described processing. If it is determined in step S310 that the predetermined response check maximum time has elapsed (Yes), the flow advances to step S311.

In step S311, it is determined whether the number of times of transmission of fault information from the information-gathering device 101 equals a predetermined number of times (e.g., once in this embodiment). If it is determined that the number of times of transmission of fault information equals the predetermined number of times (Yes), the fault information is retransmitted to the local management server 102 or center management server 106 functioning as a remote monitoring device (S312). The flow returns to step S307 to execute the above-described processing. If it is determined in step S311 that the number of times of transmission of fault information exceeds the predetermined number of times (No), the processing is ended.

Figure 4B:
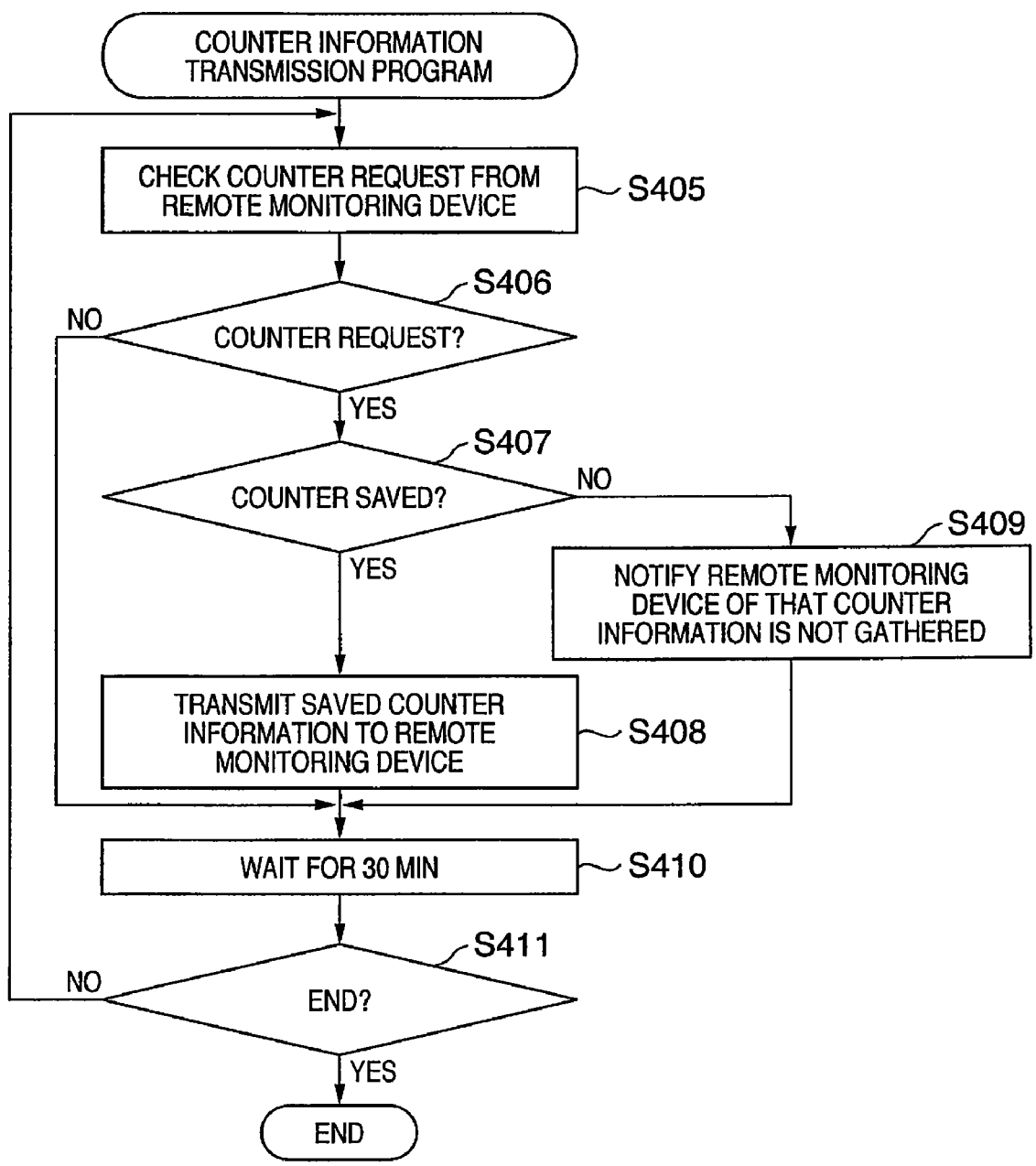

FIGS. 4A and 4B are flowcharts for explaining counter information gathering processing procedures of the information-gathering device 101 according to an embodiment of the present invention. The counter information gathering processing is executed on the basis of a counter information acquisition program and counter information transmission program stored in the information-gathering device 101.

Counter information gathering will be described below. Information to be acquired is not limited to counter information. Various kinds of information such as an error log, a print time log indicating the print output time, and a log of print frequencies can be acquired if the information represents an output log (log of output).

As the base to increment a counter value as an example of output log, the number of output pages in an image forming device will be exemplified in the following description. The number of output pages indicates the number of medium pages that have undergone image formation. For example, the number of output pages is "1" in a single-sided print mode and "2" in a double-sided print mode. The number of output pages is "1" in a 2-in-1 single-sided print mode, too. However, the base to increment the counter value is not limited to the number of output pages. For example, the physical number of output media may be employed. An image transfer job to transfer an image read by a scanner to a personal computer is also known. In this case, the number of pages transferred and output corresponds to the number of output pages.

Processing based on the counter information acquisition program will be described first with reference to the flowchart shown in FIG. 4A. The information-gathering device 101 acquires counter information containing counter values (printed sheet counts) of the image forming devices 103, 104, and 105 by using a specific protocol through the network 109 (S401). The information-gathering device 101 saves, as a file, the counter information acquired from the image forming devices 103, 104, and 105 in the internal storage device of the information-gathering device 101 or an external storage device managed by the information-gathering device 101 (S402).

The information-gathering device 101 waits for a predetermined time (e.g., 60 min in this embodiment) (S403). It is determined whether an end instruction to the counter information acquisition program in the active state is input (8404). If it is determined that an end instruction to the program is input (Yes), the program is ended. If no counter information acquisition program end instruction is input, the flow returns to step S401 to repeat the above-described processing.

Processing based on the counter information transmission program will be described next with reference to the flowchart shown in FIG. 4B.

The information-gathering device 101 inquires of the POP server to check whether counter information transmission request mail is received from the local management server 102 or center management server 106 functioning as a remote monitoring device (S405). It is determined whether a counter information transmission request is received (S406). If a counter information transmission request is received (Yes), the flow advances to step S407. If it is determined in step S406 that no counter information transmission request is received (No), the flow advances to step S410.

In step S407, the information-gathering device 101 determines whether the requested counter information is saved in the above-described storage device as a file. If it is determined that the counter information is saved as a file (Yes), the information-gathering device 101 transmits the saved counter information to the local management server 102 or center management server 106 (S408). The flow advances to step S410.

If it is determined in step S407 that the counter information is not saved as a file (No), the flow advances to step S409. In step S409, the information-gathering device 101 transmits information representing that the counter information is not gathered to the local management server 102 or center management server 106 functioning as a remote monitoring device (S409), and the flow advances to step S410.

In step S410, the information-gathering device 101 waits for a predetermined time (e.g., 3 min in this embodiment). Next, the information-gathering device 101 determines whether an end instruction to the counter information transmission program is input (S411). If it is determined that an end instruction to the program is input (Yes), the program is ended. If no program end instruction is input (No), the flow returns to step S405 to repeat the above-described processing.

Figure 5:
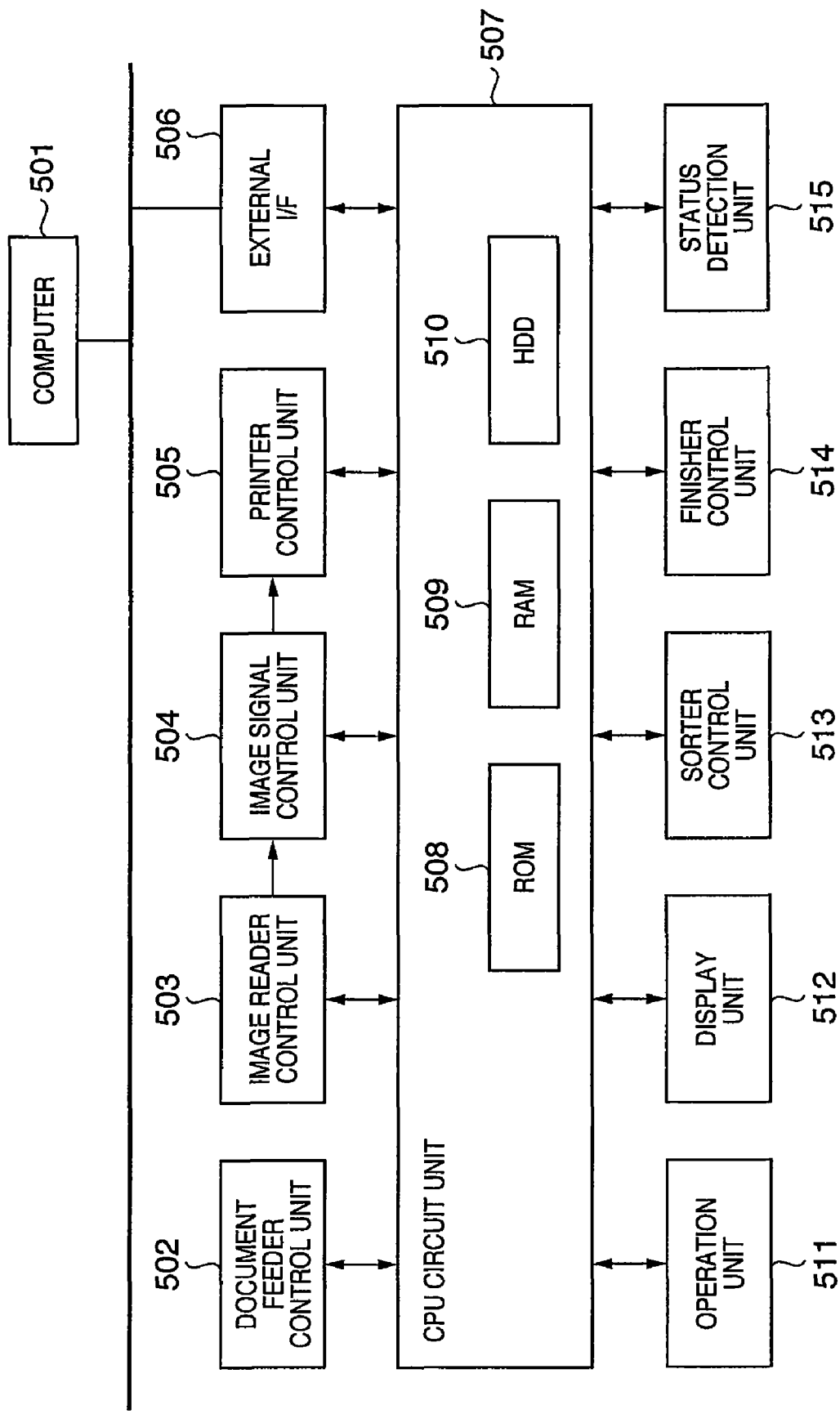
FIG. 5 is a block diagram showing the arrangement of a controller that controls the entire image forming device according to an embodiment of the present invention.

FIG. 5 is a block diagram showing the arrangement of a controller that controls the entire image forming device according to an embodiment of the present invention. As shown in FIG. 5, the image forming device controller comprises a CPU circuit unit 507. The CPU circuit unit 507 comprises a CPU (not shown), RON 508, RAM 509, and hard disk (HOD) 510 and systematically controls the blocks in accordance with a control program stored in the ROM 508. The blocks include a document feeder control unit 502, image reader control unit 503, image signal control unit 504, printer control unit 505, external I/F 506, operation unit 511, display unit 512, sorter control unit 513, finisher control unit 514, and status detection unit 515. The RAM 509 temporarily holds control data and is used as a work area for arithmetic processing of control. The hard disk 510 stores information necessary for the control program and information received from the blocks.

The document feeder control unit 502 drives and controls a document feeder (not shown) on the basis of instructions from the CPU circuit unit 507. The image reader control unit 503 drives and controls a scanner unit (not shown) and image sensor (not shown) and transfers an analog image signal output from the image sensor to the image signal control unit 504.

The image signal control unit 504 converts the analog image signal into a digital signal and executes various kinds of processing. The digital signal is converted into a video signal and output to the printer control unit 505. The external I/F 506 executes various kinds of processing for a digital image signal input from a computer 501. The digital image signal is converted into a video signal and output to the printer control unit 505. The external I/F 506 also communicates with a device management device (not shown) through a LAN interface. The processing operation of the image signal control unit 504 is controlled by the CPU circuit unit 507. The printer control unit 505 drives the above-described exposure control unit (not shown) on the basis of the received video signal.

The operation unit 511 has a plurality of keys to set various kinds of functions related to image formation and a display unit to display information representing a set state. The operation unit 511 outputs a key signal corresponding to each key operation to the CPU circuit unit 507 and displays, on the display unit 512, information corresponding to a signal from the CPU circuit unit 507.

The sorter control unit 513 and finisher control unit 514 operate on the basis of a signal from the CPU circuit unit 507 in accordance with a user input through the external I/F 506 or setting from the operation unit 511. The status detection unit 515 gathers status information from each part and executes, e.g., error detection. The CPU circuit unit 507 is notified of the result. In accordance with this notification, the CPU circuit unit 507 notifies the information-gathering device 101 or the computer 501 such as the host computer of the image forming device of the error through the display unit 512 or external I/F 506.

Figure 6:
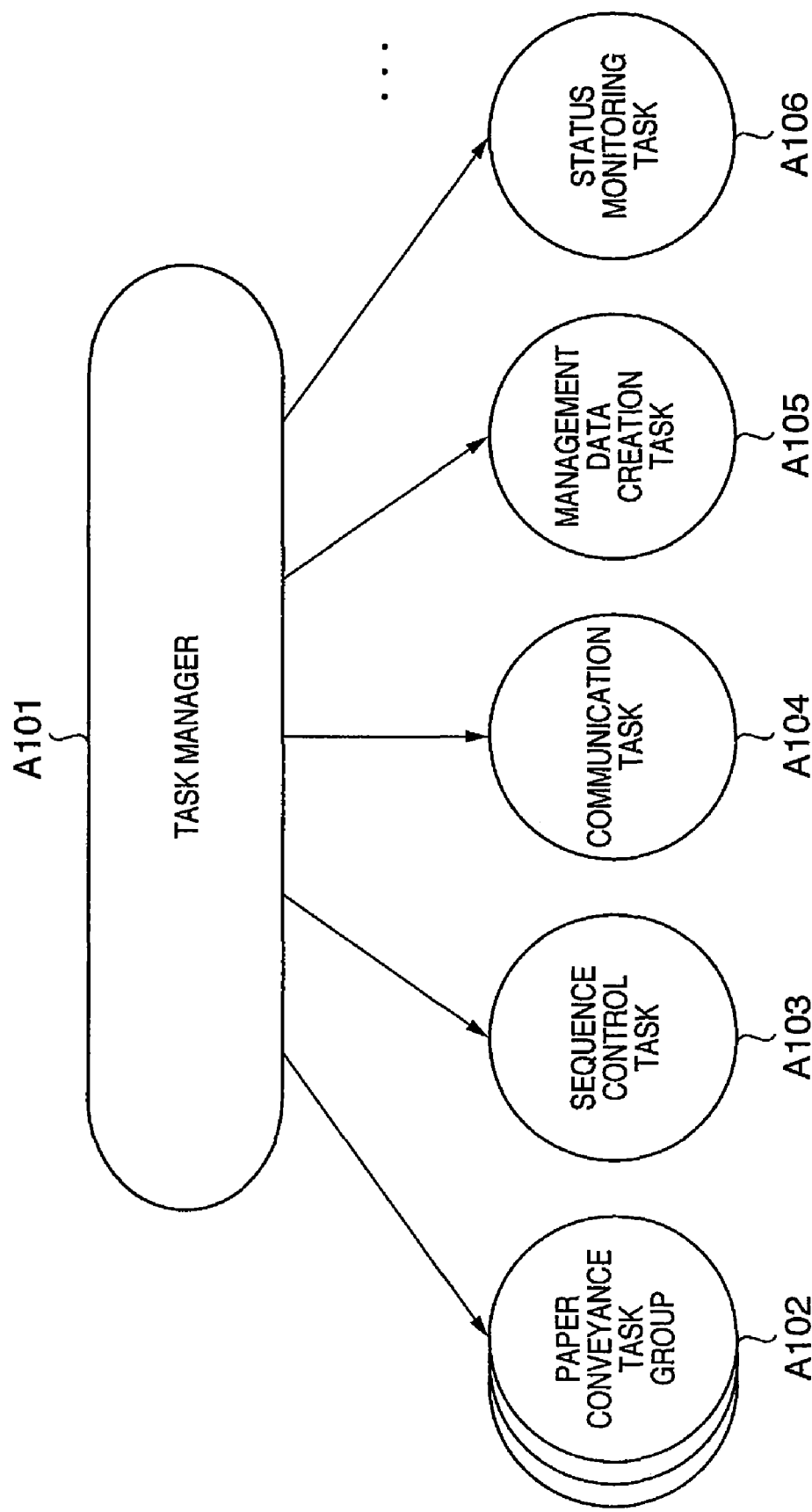
FIG. 6 is a view showing the software configuration of the image forming device according to an embodiment of the present invention.

FIG. 6 is a view showing the software configuration of the image forming device according to an embodiment of the present invention. A task manager A101 manages a plurality of tasks simultaneously. A paper conveyance task group A102 executes conveyance of a document and a paper sheet to be used for image formation. A sequence control task A103 manages the entire image forming device. A communication task A104 communicates with a device management device. The task manager A101 also includes a management data creation task A105 to create remove management data of this embodiment.

The image forming device executes counting for each paper size, each mode, each paper type, and each color in every image formation. The image forming device also executes counting for each user or user department that has instructed image formation. This count result is called a department counter. The count result is created by the management data creation task A105 and stored in the internal memory device of the image forming device. In a similar way, status information such as jam, error, and alarm is stored in the internal memory device of the image forming device in a predetermined data format. In addition, a counter (component counter) representing the life and use frequency of a consumable component is prepared for each part in the image forming device. A result counted in the management data creation task A105 is stored in the memory device of the image forming device.

When a status monitoring task A106 of the image forming device detects an abnormality (e.g., jam, error, or alarm) in the image forming device or a change in preset device status, the status is stored in the memory device of the image forming device in the management data creation task A105.

The fundamental configuration of the image forming system according to an embodiment of the present invention has been described above. Preferable counter value acquisition processing in which the counter values of two different counters, i.e., the department counter and accounting counter according to an embodiment of the present invention always match each other will be described below in detail with reference to FIGS. 7 to 9. The accounting counter indicates the counter value of a single image forming device independently of the department.

For example, assume that two departments are set in an image forming device. For a counter value of a certain type, the total printed sheet count is 1,000 in a department A and 1,500 in a department B. In this case, the total counter value of the image forming device is 2,500. The type of the department counter need not always match the type of the image forming device counter. For example, there may exist a counter value that is present in only the accounting counter as the image forming device.

FIGS. 7A and 7B are views for explaining an example of the holding format of counter values that is held in the image forming device according to an embodiment of the present invention. In this embodiment, one image forming system is used by at least one department. The image forming system holds counter information of each of at least one department, shown in FIGS. 7A and 7B.

FIG. 7A shows the holding format of the department counter. In an image forming device, the number of departments, the number of counter types, department ID tables equal in number to the departments, and counter value tables corresponding to the respective counter types in each department are held. FIG. 7B shows the holding format of the accounting counter representing the counter value of the model. In this embodiment, the number of counter types and counter value tables corresponding to the respective counter types are held. The counter value of the model indicates the counter value of an image forming device independently of the department or user. That total counter value of the image forming device must match the sum of counter values totalized in each department.

In this embodiment, a case will be described in which the total printed sheet count is stored in the counter ID1 of each department and the counter ID1 of the accounting counter.

Figure 10:
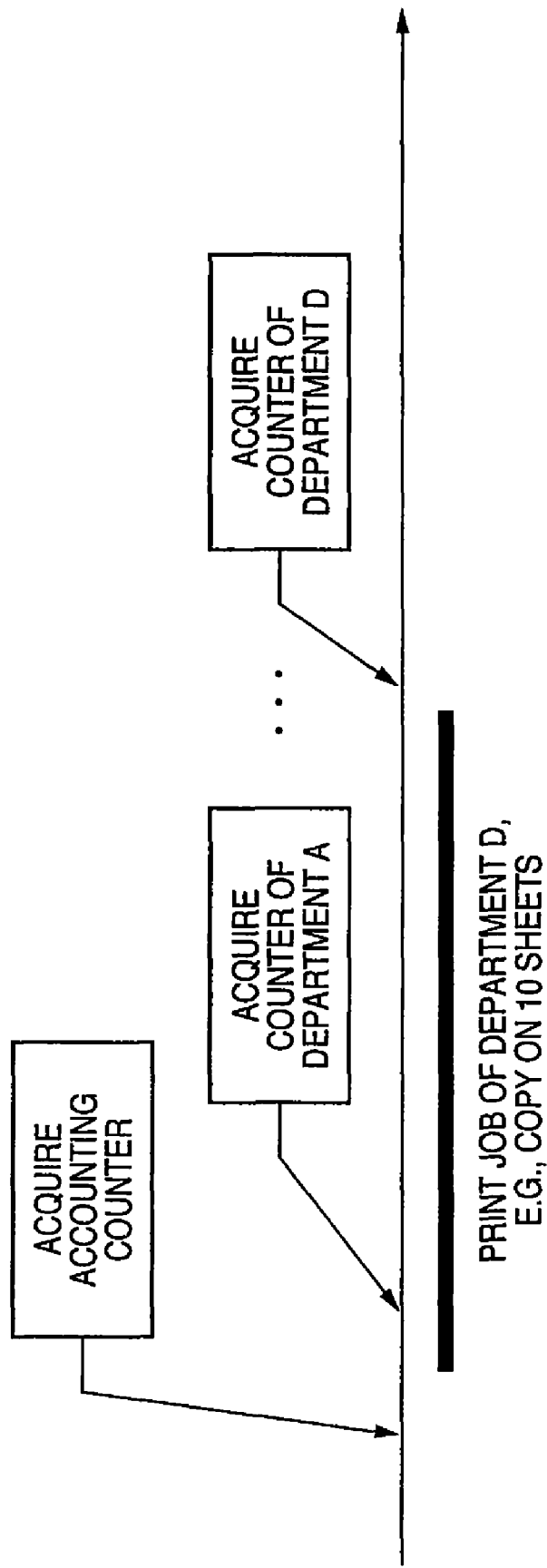
FIG. 10 is a view for explaining a case wherein the counter for all image forming devices does not match the sum of department counters.

FIG. 10 is a view for explaining a case wherein the accounting counter serving as the counter of the entire image forming system does not match the sum of the department counters. The arrow directed from the left to the right of FIG. 10 indicates the elapse of time. When a print job using 10 paper sheets is executed in a department D after acquisition of the accounting counter, the sum of the department counters is larger than the accounting counter by 10.

Figure 8:
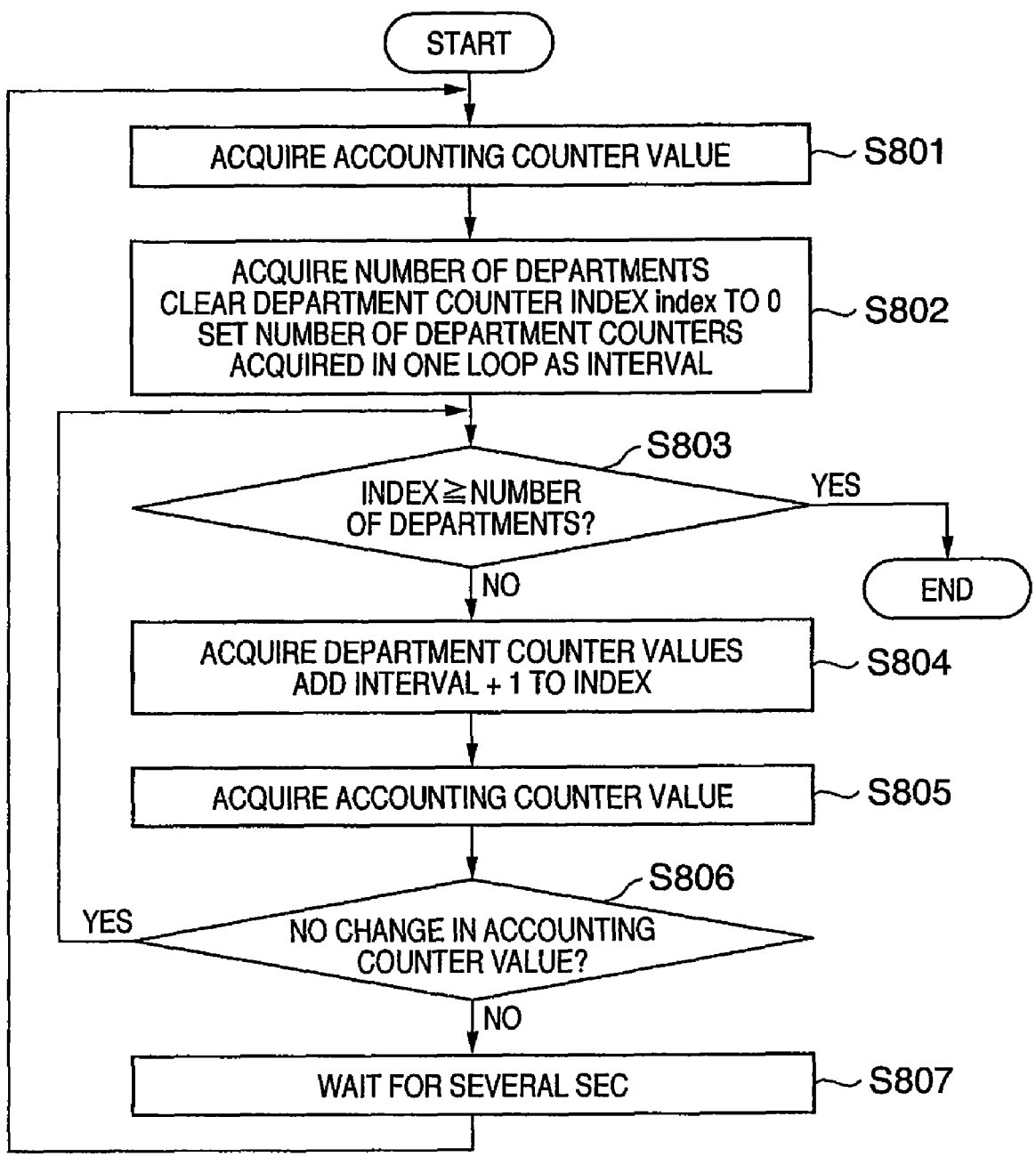
FIG. 8 is a flowchart for explaining detailed processing procedures when image forming device counter information acquisition processing (S401) shown in FIG. 4A is executed for each department.

FIG. 8 is a flowchart for explaining detailed processing procedures when image forming device counter information acquisition processing (S401) shown in FIG. 4A is executed for each department. In this flowchart, it is determined whether an output log acquired first is changed during acquisition of the output log of a department or user. When it is checked that the output log is not changed, the output log of the department or user is decided. This flowchart represents an operation when the number of monitored image forming devices is one.

The counter values of the image forming device shown in FIG. 7B are acquired from the counter ID1 to counter IDn2 of the accounting counter and saved as an accounting counter value before department counter acquisition (S801). The processing in step S801 corresponds to a first accounting counter value acquisition means for acquiring a reference value to check later whether the accounting counter value is changed. This means functions as the first accounting counter value acquisition means in step S901 to be described later.

The number n1 of departments shown in FIG. 7A is acquired, and index representing the number of acquired departments is cleared to 0. In addition, the number of departments acquired in one loop of department counter acquisition processing is set as "interval" (S802). The number of departments may be either one or two or more.

Whether all department counter values are acquired is determined on the basis of whether the value index is equal to or smaller than the number n1 of departments acquired in step S802 (S803). If it is determined that all department counter values are acquired (Yes), the counter information acquisition processing is ended. The flow advances to step S402 of the flowchart shown in FIG. 4 to save the counter information.

If it is determined in step S803 that all department counter values are not acquired (No), department counter values corresponding to "interval" after the department indicated by the value index are acquired (S804). When the number of departments is smaller than ("index"+"interval"), department counter values for the departments are acquired, and the processing in step S84 is ended. After the department counters are acquired, "interval" is added to "index" to update "index".

The current accounting counter value is acquired from the counter ID1 to counter IDn2 of the accounting counter value (S805). The processing in step S805 functions as a second accounting counter value acquisition means for acquiring the accounting counter value again to check whether the accounting counter value is changed during acquisition of the department counter values. If the accounting counter value acquired in step S805 is used as a reference value which is to be compared with an accounting counter value acquired again, the processing in step S805 can be regarded as the first accounting counter value acquisition means. Step S905 (to be described later) also functions as a third or first accounting counter value acquisition means. As the accounting counter value serving as the reference value to determine a change in step S805, the value acquired in step S801 may be referred to. If the change of the accounting counter value should be checked a plurality of number of times, a value acquired immediately before (preceding S805) may be referred to.

The accounting counter value before department counter acquisition which is acquired in step S801 is compared with the accounting counter value acquired in step S805 (S806). If it is determined that the accounting counter value before department counter acquisition does not match the accounting counter value (i.e., the counter value has changed) (No), this indicates that a print operation was executed in the image forming device during department counter acquisition. The department counter acquisition processing is ended. In step S807, the processing waits for several sec (e.g., 3 sec). The flow returns to step S801 to execute the above-described processing again.

If the accounting counter value has not changed (Yes) in step S806, the flow returns to step S803 to repeat the above-described processing for the department counters of the next loop. On condition that the determination means in step S806 determines that the counter values match, the output log acquired by the acquisition means in step S805 is decided as the output log of the department or user.

In this way, in step S806, the accounting counter is acquired again, and it can be checked whether the accounting counter acquired again has changed from that acquired at the timing in step S801.

With this processing, a counter value that guarantees matching between the accounting target printed sheet count, the sum of the printed sheet counts of the departments, and the total printed sheet count can be transmitted to, e.g., a server functioning as a remote monitoring device without wastefully acquiring counter information. Hence, accurate accounting for each department is possible.

Figure 9:
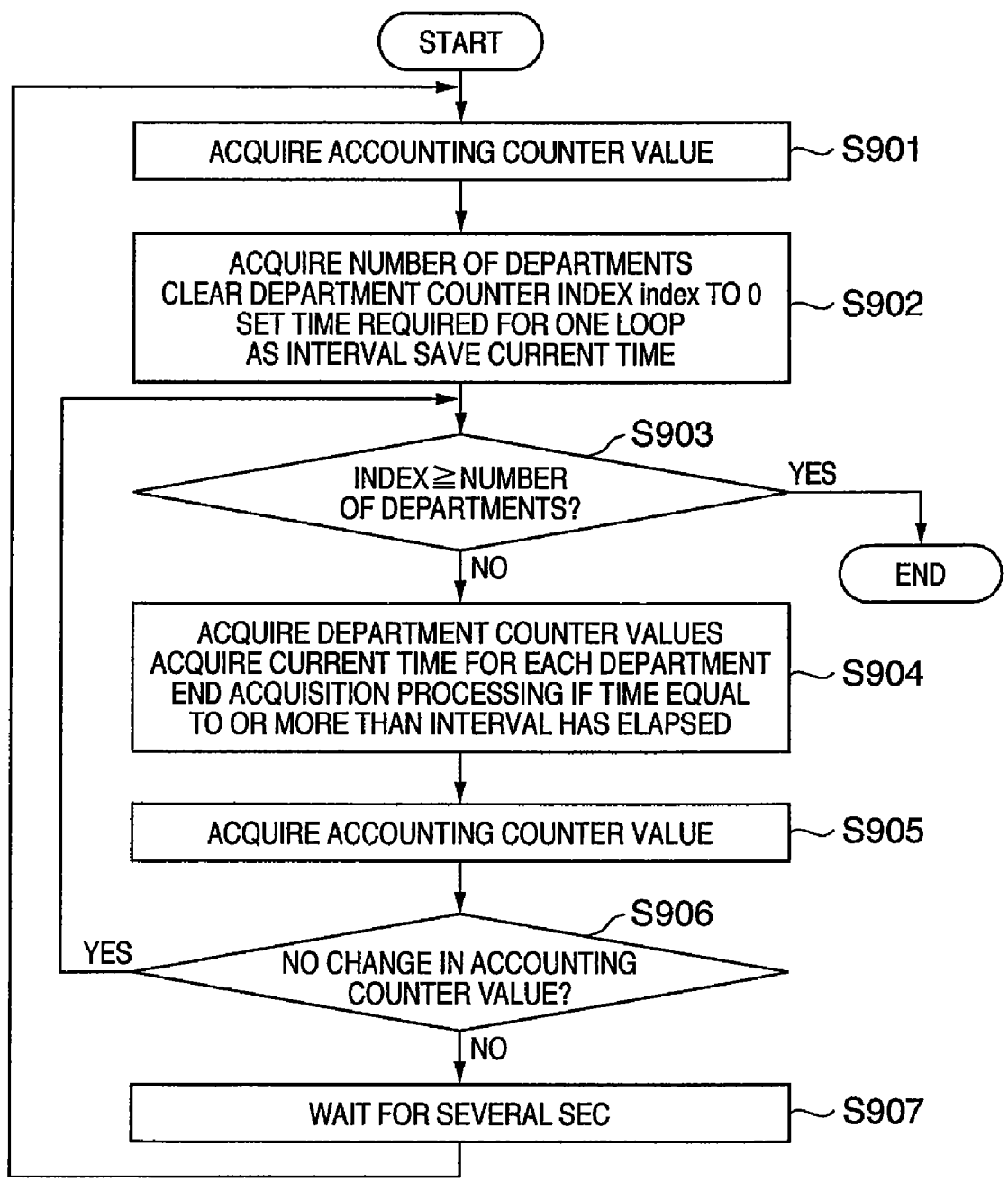
FIG. 9 is a flowchart for explaining detailed processing procedures when image forming device counter information acquisition processing (S401) shown in FIG. 4A is executed every predetermined time.

FIG. 9 is a flowchart for explaining detailed processing procedures when image forming device counter information acquisition processing (S401) shown in FIG. 4A is executed every predetermined time. FIG. 9 corresponds to processing executed by the information-gathering device 101 serving as the main processor of the flowchart shown in FIG. 4A.

The counter values of the image forming device shown in FIG. 7B are acquired from the counter ID1 to counter IDn2 of the accounting counter and saved as an accounting counter value before department counter acquisition (S901).

The number n1 of departments shown in FIG. 7A is acquired, and index representing the number of acquired departments is cleared to 0. In addition, the time required for one loop of department counter acquisition processing is set as "interval" (S902). The current time is also saved.

Whether all department counter values are acquired is determined on the basis of whether the value index is equal to or smaller than the number n1 of departments acquired in step S902 (S903). If it is determined that all department counter values are acquired (Yes), the counter information acquisition processing is ended. The flow advances to step S402 of the flowchart shown in FIG. 4 to save the counter information.

If it is determined in step S903 that all department counter values are not acquired (No), department counter values are acquired (S904). Every time the counter value of a department is acquired, the current time is acquired. If a time equal to or more than "interval" has elapsed from the time saved in step S902, the processing in step S904 is ended.

Next, the accounting counter value is acquired (S905). The accounting counter value before department counter acquisition, which is acquired in step S901, is compared with the accounting counter value acquired in step S905 (S906). If it is determined that the accounting counter value do not match (i.e., the counter value has changed) (No), this indicates that a print operation was executed in the image forming device during department counter acquisition. The department counter acquisition processing is ended. In step S907, the processing waits for several sec (e.g., 3 sec). The flow returns to step S901 to execute the above-described processing again.

If the accounting counter value has not changed from that at the acquisition timing in step S901 (Yes) in step S906, the flow returns to step S903 to repeat the above-described processing for the department counters of the next loop.

(Second Embodiment)

In the above-described embodiment, focus is placed on one image forming device. The counter values of a plurality of departments (users) set for the image forming device are accurately acquired by the information-gathering device 101. In the second embodiment, processing of acquiring the counter values of departments of each image forming device from a plurality of image forming devices 103 to 105 will be described.

Figure 11:
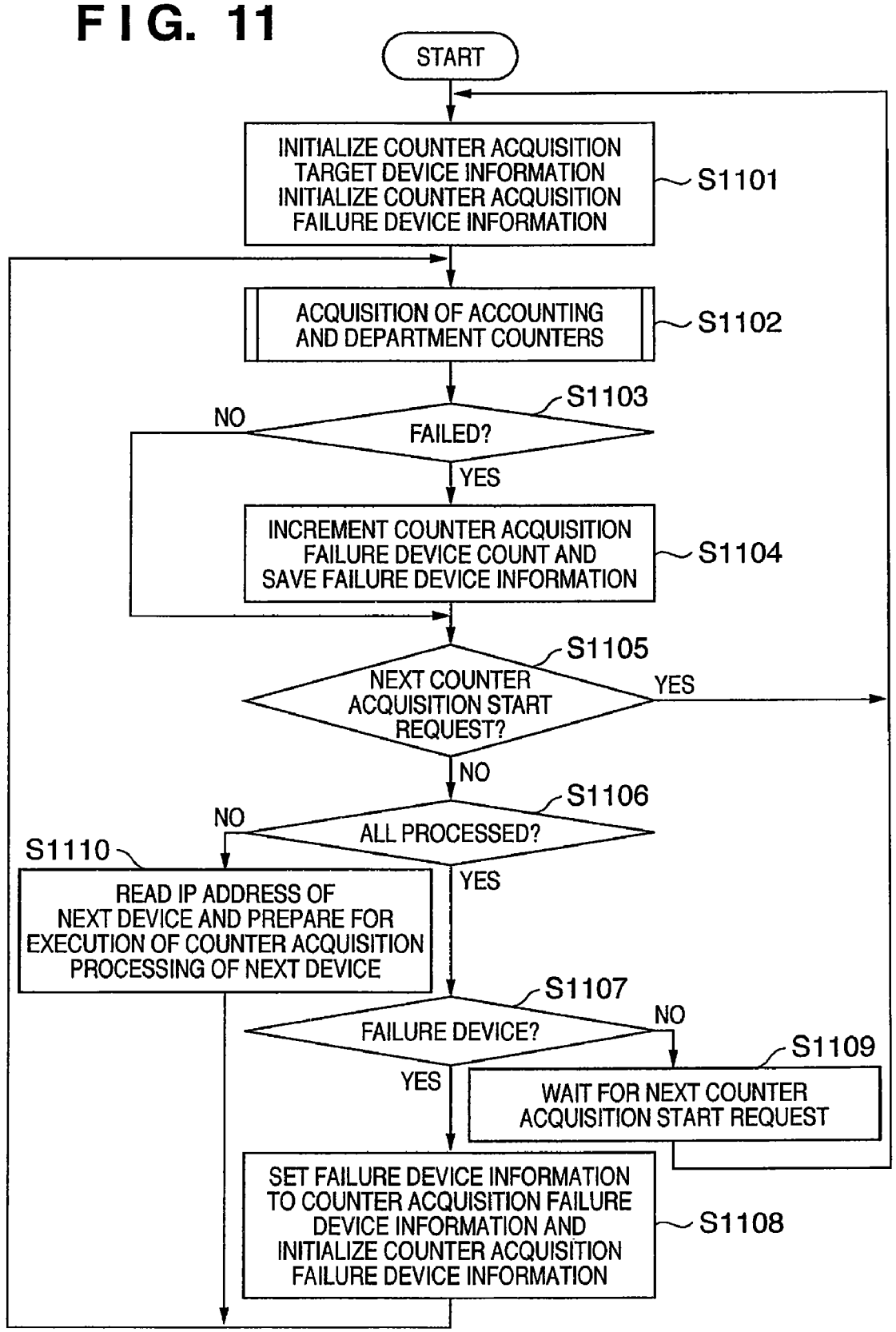
FIG. 11 is a flowchart for explaining detailed processing procedures when image forming device counter information acquisition processing (S401) shown in FIG. 4A is executed for each department while monitoring a plurality of image forming devices.

FIG. 11 is a flowchart for explaining an operation of acquiring accounting counters and department counters from a plurality of image forming devices according to the second embodiment.

In step S1101, the number of monitored devices is set as counter acquisition target device information. Information such as the IP addresses of all monitored devices is set as the counter acquisition target devices. In addition, 0 is set to the number of failure devices as counter acquisition failure information. The monitored devices indicate, e.g., the image forming devices 103 to 105 in FIG. 1. Devices of any other type such as a general personal computer may be used.

In step S1102, the accounting counter value and department counter values are acquired from each device. This processing is the same as in steps S801 to S806 shown in FIG. 8 and steps S901 to S906 shown in FIG. 9. If Yes in step S803 or S903, the processing is successfully done. If No in step S806 or S906, the processing fails. If the processing has failed, step S1102 is skipped.

If it is determined in step S1103 that the accounting counter value & department counter value acquisition processing has failed, in step S1104, the counter acquisition failure device count is incremented, and information such as the IP address of the failure device is saved as counter acquisition failure device information.

In step S1105, the presence/absence of the next counter acquisition start request is checked. Normally, the acquisition start request is not issued halfway through acquisition of the accounting counter values and department counter values of all monitored devices. This is because the acquisition request issue interval is set to be longer than the time required for acquisition of the accounting counter values and department counter values of all monitored devices. However, it is impossible to deny that the request may be issued halfway through re-acquisition processing of the accounting counter value and department counter values of an acquisition failure device. If it is determined in step S1105 that the next counter acquisition request is present, the flow returns to step S1101 to start acquisition processing of the accounting and department counters of all monitored devices.

If it is determined in step S1106 that acquisition processing of all devices whose counter values should be acquired this time is not ended, the IP address of the next device to be subjected to counter acquisition is read and set in step S1110. The flow returns to step S1102 to execute accounting counter value & department counter value acquisition processing of the next device. Information to specify the next device to be subjected to counter acquisition is not limited to the IP address. For example, a MAC address or a device name for name solution to be used in a network environment of Windows® can be used in place of the IP address if the information can specify the device to be subjected to counter acquisition by communication with the partner device.

Next to step S1110, the already described processing from step S1102 is repeatedly executed for the next device (when the preceding device is defined as the first image forming device, the next device is the second image forming device).

If it is determined in step S1106 that acquisition processing of all devices to be subjected to acquisition this time is ended, it is determined in step S1107 whether a device that has failed acquisition is present. If it is determined in step S1107 that a device that has failed acquisition is present, in step S1108, the acquisition failure device count is set as the counter acquisition target device count, and acquisition failure device information is set as the counter acquisition target device information. In addition, the counter acquisition failure device information is initialized, i.e., 0 is set as the counter acquisition failure device count.

If it is determined in step S1107 that there is no device that has failed acquisition, the processing waits for the next counter acquisition start request in step S1109. When the counter acquisition start request is received, the flow returns to step S1101.

FIG. 12 is a view showing the holding format of department counter values and accounting counter values of a given image forming device, which are acquired by the counter acquisition operation described in the flowcharts in FIGS. 11, 8, and 9. Each department counter in FIG. 12 is acquired in step S804 or S904 functioning as the second acquisition means. Each accounting counter may be acquired either in step S801 or S901 functioning as the first acquisition means or in step S805 or S905 functioning as the third acquisition means. Especially, identical accounting counter values are acquired in steps S801 and S805, and one of them is employed. This also applies to steps S901 and S905 in FIG. 9.

The holding format shown in FIG. 12 fundamentally complies with the counter holding format described in FIGS. 7A and 7B. Device specifying information 1201 corresponds to an IP address read in step S1110 in FIG. 11. Any other information except the IP address can be used if it can specify the device to be subjected to counter acquisition by communication with the partner device, as described above. A department count 1202 corresponds to the "number n1 of departments" in FIG. 7A. A counter type count 1203 of each department corresponds to the "number m1 of counters" in FIG. 7A. An accounting counter type count 1204 corresponds to the number n2 of counters in FIG. 7B. A department ID1 1205 and department ID2 1209 indicate two departments included in the department ID1 to department IDn1 in FIG. 7A. Department counters 1206 to 1208 correspond to the counter ID1 to counter ID3 in FIG. 7A, respectively. Department counters 1210 to 1212 also correspond to the counter ID1 to counter ID3 in FIG. 7A, respectively. Accounting counters 1213 to 1217 correspond to the counter ID1 to counter ID4 in FIG. 7B, respectively.

The various kinds of counters shown in FIG. 12 will be described here in detail. Each of the total sheet counts 1206 and 1210 indicates the whole counter value in a given department independently of the paper size and type and the job type. Each of the color copy counts 1207 and 1211 indicates the number of outputs of color copy jobs. Each of the color printed sheet counts 1208 and 1212 indicates the number of outputs of color PDL printing. PDL printing indicates printing executed on the basis of a PDL job issued from an external computer to an image forming device.

The accounting counter 1 (total sheet count) 1213 indicates the counter value of one image forming device for a plurality of departments and coincides with the sum of the department counters 1 (total sheet counts) 1206 and 1210. The color large sheet count of accounting counter 4 indicates the color printed sheet count for a paper size of, e.g., A3 or more. The monochrome large sheet count of accounting counter 5 indicates the monochrome printed sheet count for a paper size of, e.g., A3 or more. As for the accounting counters, the sum of accounting counters 2 to 5 coincides with accounting counter 1. However, the values need not always coincide. For example, the counter value holding format shown in FIG. 12 may be formed except accounting counter 5. In each department, the sum of counters does not coincide with the total sheet count.

Count data held in this format is transmitted from the information-gathering device 101 to the center management server 106 at a specific timing by the processing in step S408 of the counter information transmission program described in FIG. 4B.

On the basis of the received counter information, the center management server 106 executes accounting processing for each image forming device and for each department of a specific image forming device. The accounting processing here includes processing of determining the accounting amount by multiplying the each counter value by its unit price on the basis of the accounting counter values shown in FIG. 12 and outputting a report of the determined accounting amount including particulars. Processing of outputting a report of print output states of the departments of a specific image forming device is also included.

As described above, if it is confirmed that an image forming device is operating halfway through acquisition of the accounting counter values and department counter values from the plurality of image forming devices in accordance with the flowchart shown in FIG. 11 (YES in step S1103), the counter values of other image forming devices can be acquired sequentially. Hence, in acquiring counter values from the plurality of image forming devices, accounting counter values of inoperative image forming devices can be acquired preferentially. The efficiency can be increased because the processing need not wait for the end of operation of a specific image forming device. In addition, information about the image forming device whose operation is confirmed during department counter value acquisition (S1104), and the counter values (output log) of the image forming device can be acquired again. Hence, reliable counter acquisition processing of a plurality of image forming devices can be implemented.

(Third Embodiment)

In the first and second embodiments, a counter value assuming printing on a medium has been described. However, the counter value is not limited to printing. For example, an image transfer job to transfer an image read by a scanner to a personal computer is also known. In this case, the number of pages transferred and output may be used as a counter value.

The above-described flowcharts shown in FIGS. 8, 9, and 11 can also be executed by using the output log of image transfer jobs as a counter value.

As described above, according to the embodiments, an output log acquired in correspondence with a department and an output log acquired in correspondence with an image forming device can accurately be acquired on the management side without providing any special arrangement on the image forming device side.

According to the embodiments, accurate counter information can be acquired from an image forming device that sequentially acquires output log information of each department instead of acquiring output log information of departments or users at once.

(Other Embodiment)

The embodiments have been described above in detail. The present invention can take a form of, e.g., a system, apparatus, method, program, or storage medium (recording medium). More specifically, the present invention can be applied to a system including a plurality of devices or an apparatus including a single device.

The present invention is also achieved even by supplying a software program which implements the functions of the above-described embodiments to the system or apparatus directly or from a remote site and causing the computer of the system or apparatus to read out and execute the supplied program code. The software program corresponds to the flowcharts illustrated in the above-described embodiments.

Hence, the program code itself, which is installed in the computer to implement the functional processing of the present invention by the computer, also implements the present invention. That is, the present invention also incorporates the computer program itself to implement the functional processing of the present invention.

In this case, the program can take any form such as an object code, a program to be executed by an interpreter, or script data to be supplied to the OS as long as the functions of the program can be obtained.

As a recording medium to supply the program, for example, a flexible disk, hard disk, optical disk, magnetooptical disk, MO, CD (CD-ROM, CD-R, or CD-RW), magnetic tape, nonvolatile memory card, ROM, or DVD (DVD-ROM or DVD-R) can be used.

As another program supply method, a client computer may be connected to a homepage on the Internet by using a browser in the client computer, and the computer program itself of the present invention is supplied from the homepage. Alternatively, a compressed file containing an automatic install function is downloaded to a recording medium such as a hard disk and supplied. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program by using the key information, and install the program in the computer.

The functions of the above-described embodiments are implemented not only when the readout-program is executed by the computer but also when, e.g., the OS running on the computer performs part or all of actual processing on the basis of the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing on the basis of the instructions of the program.

The present invention has been described above by way of preferred embodiments. However, the present invention is not limited to the above-described embodiments, and various changes and modifications can be made within the scope of the claims.

This application claims the benefit of Japanese Patent Application No. 2005-168402 filed on Jun. 8, 2005 and Japanese Patent Application No. 2006-117190 filed on Apr. 20, 2006, which are hereby incorporated by reference herein in its entirety.

What is claimed is:

1. An information processing apparatus that communicates with an image forming device via a network, comprising:
    a first acquisition unit that acquires total output log information in the image forming device;
    a second acquisition unit that acquires output log information for a department or a user in the image forming device;
    a third acquisition unit that acquires the total output log information in the image forming device again after acquisition of the output log information for the department or the user by said second acquisition unit; and
    a determination unit that determines whether or not the total output log information has changed during the acquisition of the output log information for the department or the user by comparison of the total output log information acquired by said first and third acquisition units,
    wherein the output log information acquired by said second acquisition unit
        is taken as appropriate output log information for the department or the user if said determination unit determines that the total output log information has not changed, and
        is not taken as appropriate output log information for the department or the user if said determination unit determines that the total output log information has changed.

2. The apparatus according to claim 1, wherein, after the acquired output log information for the department or the user is taken as appropriate output log information,
   said second acquisition unit acquires output log information for another department or another user, and
   said determination unit determines whether or not the total output log information has changed,
   wherein the acquired output log information for that other department or that other user is taken as appropriate output log information if it is determined that the total output log information has not changed.

3. The apparatus according to claim 1, wherein said second acquisition unit sequentially acquires output log information for each department or each user instead of acquiring output log information for a plurality of departments or a plurality of users at once.

4. The apparatus according to claim 1, wherein accounting processing is executed for each department or each user on the basis of the acquired output log information for the department or the user that is taken as appropriate output log information.

5. The apparatus according to claim 1, further comprising:
   a setting unit that sets a second image forming device as an output log information acquisition target if said determination unit determines that the total output log information has changed; and
   a first control unit that causes said first acquisition unit, said second acquisition unit, and said third acquisition unit to execute acquisition processing for the second image forming device set by said setting unit.

6. The apparatus according to claim 5, further comprising a second control unit that causes said first acquisition unit, said second acquisition unit, and said third acquisition unit to execute acquisition processing for the image forming device again when the acquired output log information for a department or a user of the second image forming device is taken as appropriate output log information.

7. An information processing method for use in an information processing apparatus that communicates with an image forming device via a network, said method comprising the steps of:
   acquiring total output log information in the image forming device;
   acquiring the output log information in the image forming device for a department or a user set for the image forming device;
   acquiring the output log information in the image forming device again after acquisition of the output log information for the department or the user in said second acquisition step;
   determining whether or not the total output log information has changed during the acquisition of the output log information for the department or the user by comparison of the total output log information acquired in said first and third acquiring steps, wherein the output log information acquired in said second acquiring step
   is taken as appropriate output log information for the department or the user if it is determined in said determining step that the total output log information has not changed, and
   is not taken as appropriate output log information for the department or the user if it is determined in said determining step that the total output log information has changed.

8. The method according to claim 7, wherein, after the acquired output log information for the department or the user is taken as appropriate output log information,
   output log information for another department or another user is acquired in said second acquiring step, and
   it is determined in said determining step whether or not the total output log information has changed,
   wherein the acquired output log information for that other department or that other user is taken as appropriate output log information if it is determined that the total output log information has not changed.

9. The method according to claim 7, wherein, in said second acquiring step, output log information for each department or each user is sequentially acquired instead of being acquired for a plurality of departments or a plurality of users at once.

10. The method according to claim 7, wherein account processing is executed for each department or each user on the basis of the acquired output log information for the department or the user that is taken as appropriate output log information.

11. The method according to claim 7, further comprising the steps of:
   setting a second image forming device as an output log information acquisition target if it is determined in said determining step that the total output log information has changed; and
   causing said first acquiring step, said second acquiring step, and said third acquiring step to execute acquisition processing for the second image forming device set in said setting step.

12. The method according to claim 11, further comprising a step of causing said first acquiring step, said second acquiring step, and said third acquiring step to execute acquisition processing for the image forming device again when the acquired output log information for a department or a user of the second image forming device is taken as appropriate output log information.

13. A non-transitory computer-readable recording medium, which records, in executable form, a program for causing a computer to execute the information processing method of claim 7.

* * * * *